United States Patent [19]

Bonori et al.

[11] 4,295,131

[45] Oct. 13, 1981

[54] LOW CONSUMPTION PULSES DOPPLER EFFECT INTRUSION SENSOR

[75] Inventors: Maurizio Bonori; Cafiero Franconi, both of Rome, Italy

[73] Assignee: AD.ELE. -Advanced Electronics- S.R.L., Rome, Italy

[21] Appl. No.: 897,776

[22] Filed: Apr. 19, 1978

[30] Foreign Application Priority Data

May 10, 1977 [IT]  Italy ............................. 49333 A/77

[51] Int. Cl.³ .................. G01S 13/56; G08B 13/18
[52] U.S. Cl. ............................ 340/554; 343/5 PD;
     343/17.1 PF; 367/94
[58] Field of Search ......... 340/554, 560; 343/5 PD,
     343/7.7, 17.1 PF; 367/94

[56] References Cited

U.S. PATENT DOCUMENTS

| | | | |
|---|---|---|---|
| 3,673,590 | 6/1972 | Corvi et al. ..................... | 340/554 |
| 3,731,307 | 5/1973 | Charlot, Jr. ..................... | 340/554 X |
| 3,754,254 | 8/1973 | Jinman ........................... | 340/554 X |
| 3,975,729 | 8/1976 | Ringer ........................... | 343/5 PD |

Primary Examiner—John W. Caldwell, Sr.
Assistant Examiner—Joseph E. Nowicki
Attorney, Agent, or Firm—Wenderoth, Lind & Ponack

[57] ABSTRACT

The present invention is related to intrusion sensors for alarm systems which employ Doppler detection. The transmitter of this invention transmits pulse modulated signals having a pulse repetition frequency greater than twice the highest Doppler frequency to be detected. In a manner similar to the well known sampling theorem, the received reflected pulses contain all the Doppler information contained in a similar continuous oscillation Doppler detection system because the highest Doppler frequency to be detected can be reconstituted from the received reflected signals. The duty cycle of the transmitted pulses is limited by the above described pulse repetition frequency limitation and a further requirement that the pulse length be sufficient to enable return of the leading edge of the pulse prior to the end of the pulse.

7 Claims, 14 Drawing Figures

LOW CONSUMPTION PULSES DOPPLER EFFECT INTRUSION SENSOR

The present invention refers to motion sensors used as intrusion sensors for alarm systems exploiting the principle of the Doppler effect of waves of any kind.

The Doppler phenomenon is widely known and exploited for detecting and measuring the velocity of bodies moving with respect to a source of waves in which the wave propagation is incident on these bodies hereinafter called targets. In describing the propagation of wave motions through relative vectors propagating in the medium surrounding the source, one realizes that all the considerations of the Doppler effect apply equally to vectorial fields characterized by vectors either transversal or longitudinal with respect to the propagation direction. In the description of the prior art of the various forms of the present invention, electromagnetic fields at microwave frequencies are chosen as examples, however it is to be understood that the same considerations will apply to waves of different nature as well, as for instance to acoustic waves, by the simple substitution of pressure fields for electric fields and of the acoustic wave propagation velocity for that of the electromagnetic waves.

The present invention will be described in conjunction with the following figures.

Figure 1A:
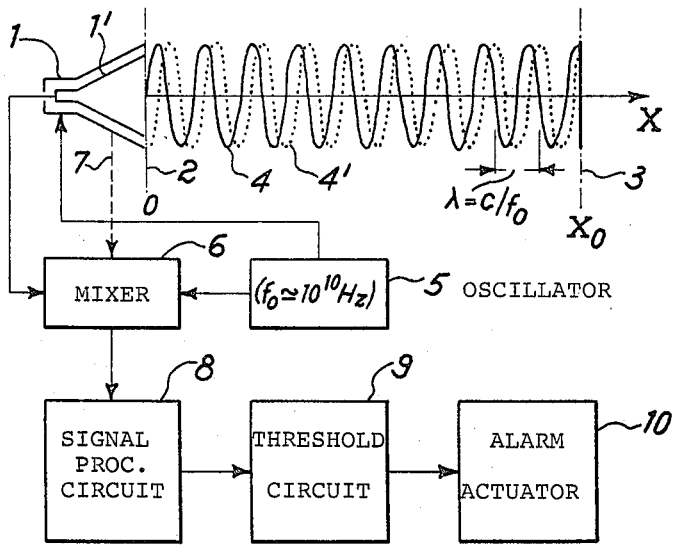
FIG. 1A illustrates an example of a typical prior art continuous wave Doppler detection system.

The Doppler phenomenon has been exploited by the prior art to develop intrusion sensors the working principles of which may be illustrated by the help of the functional block diagram of FIG. 1. In this as in the following figures, the reference numberals correspond to similar parts. In FIG. 1a the transmitter, in this example a microwave transmitter, is represented by its transmitting antenna 1, while the receiver is represented by its receiving antenna 1'. These antennas are for the sake of simplicity mounted coaxially and coplanarly, their phase plane being represented by 2. The reflecting target is indicated by the line 3 of a plane perpendicular to the propagation direction of the microwaves located in front of the antennas and ideally represents an intruder. The x axis along which the distance between planes 2 and 3 is measured coincides with the propagation direction of the rays and the origin of the abscissa is fixed at the plane 2 so that in this reference system the target 3 is at a distance $x_o$.

Limiting our consideration to the vectorial electric field generated by the antenna 1 at the x=0 point and expressed as $e = E \cos(\omega_o t)$ for the continuous wave oscillation represented by the wave 4 and described by the equation $e = E \cos[\omega_o(t+x/c)]$, where c is the velocity of propagation of the electromagnetic waves, the function describing the electric field vector of the continuous wave reflexed by target 3 at $x_o$ is known to be of the form: $b = B \cos[\omega_o(t - 2x_o/c)]$ or, setting $\omega_o/c = 2\pi/\lambda$, we may write $b = B \cos(\omega_o t - 2\pi 2 x_o/\lambda)$. This is represented by wave 4'.

The return continuous wave therefore is attenuated by a factor B/E and has a phase difference of $(4\pi x_o/\lambda)$ with respect to the incident wave of the same frequency. Let us now assume that in a very simplified case, the target 3 moves along the x axis toward increasing values with constant velocity $V_d$ (if the target were moving in the opposite direction the velocity would be $-V_d$). The distance between transmitting antenna and target will now be $x = x_o + V_d t$, and the return signal will in this case be:

$$b = B \cos[\omega_o t - 4\pi/\lambda(x_o + V_d t)] \qquad (1)$$

the term $(4\pi V_d/\lambda)$ having the dimensions of angular velocity which we shall call: $\omega_d = 2\pi f_d$, whereby $$f_d = 2 V d f_o / c \qquad (2)$$

and therefore $f_d = (2V_d/\lambda)$. Setting $\phi_o = (4\pi x_o/\lambda)$, equation (1) becomes:

$$b = B \cos[\omega_o - \omega_d) t - \phi_o] \qquad (3)$$

The continuous return wave in this case is also attenuated and exhibits a phase difference, however it no longer has the same frequency as the incident wave, but a frequency shifted from this by $f_d$. This shift is named either the Doppler shift or the Doppler frequency. Of course the amplitude factor B will depend on the distance $x_o$ and on the energy reflected back by target 3. Since $f_d$ depends upon both the frequency $f_o = (\omega_o/2\pi)$ of the generated wave and the target velocity $V_d$ ($f_d = 2 f_o V_d / V_o$), where $V_o$ is the phase velocity of the propagating wave which equals c ($3 \times 10^8$ m/sec) in the case of the electromagnetic waves, there will be a definite range of Doppler frequencies for each $f_o$ for typical animal and human motions. In fact for these one may consider approximately $V_d \approx (10^{-2}$ to $10)$ m/sec so that for instance for microwaves in the X-Band ($f_d \approx 10^{10}$ Hz), a band commonly used by the prior art intrusion detectors, one will obtain Doppler frequencies within the range between the frequency lower limit that we shall call $f_1$ given by $f_1 \simeq 0.6$ Hz, corresponding to the velocity lower limit of $\simeq 10^{-2}$ m/sec, and the frequency upper limit that we shall call $f_2$ given by $f_2 = 600$ Hz, corresponding to the velocity upper limit of 10 m/sec. This maximum possible Doppler frequency spectrum range hereinafter will be indicated by $f_d = f_2 - f_1$, and will represent the maximum bandwidth of the Doppler information in the case examined. In the intrusion sensors of the prior art the extraction of the Doppler signal from return continuous wave 4' characterized by equation (3) has been carried out by circuit means of various types depending on the nature and frequency of the protecting radiated field, however they may be illustrated by the functional block diagram of FIG. 1a, which exemplifies the principles of one of said sensors working with microwaves.

Figure 1B:
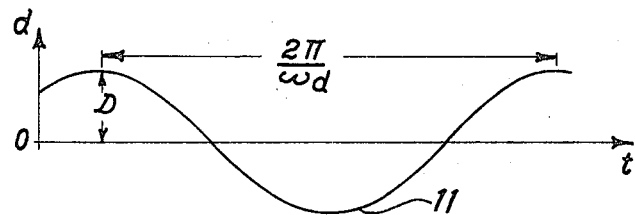
FIG. 1B illustrates an example of a Doppler signal obtainable by the prior art device of FIG. 1A.

In FIG. 1a block 5 is a continuous wave oscillator feeding the transmitting antenna 1 which radiates signal 4 through space, and the Doppler signal is extracted from return wave 4' characterized by equation (3), incident upon receiving antenna 1'. Return wave 4' is fed to mixer 6 where it is mixed with the signal represented by equation (1) either picked up from oscillator 5, as indicated in FIG. 1A by the solid line, or picked up as a fraction of the energy at the transmitting antenna 1 through a link indicated by the dashed line 7 on the same figure. The choice between these two ways and the pratical methods of their development are well known to the people skilled in this field. The conversion products at the output of mixer 6 may generally be described with equations of the type:

$$d = D \cos(-\omega_d t - \phi_o) + D \cos[(2\omega_o - \omega_d)t - \phi_o].$$

from a continuous signal of this type one might easily obtain a continuous signal at the Doppler frequency, that is the component:

$$d = D \cos(-\omega_d t - \phi_o) \qquad (4)$$

by suitably filtering the mixer output signal by a filtering device rejecting the signals at the frequency $2\omega_o$ also produced by the mixer. In equation (4) amplitude D depends, like amplitude B of equation (3), upon the distance $x_o$ to the target as well as its reflecting power. In FIG. 1b the continuously oscillating signal at frequency $f_d$ at the output of mixer 6 is signal 11, represented in the time domain. This signal is further processed by a signal processing circuit (block 8 of FIG. 1a) which extracts (defects) all or part of the Doppler information carried by this signal in order to be utilized as wished. In regard to this note that the maximum information obtainable from this signal 11 (equation 4) regarding its amplitude D, its frequency $\omega_d$ and its relative phase $\phi_o$, may be utilized separately to obtain diversified information on the target motion according to the Doppler effect theory. In the most general case of a plurality of moving targets one will obtain a complex Doppler signal, the frequency spectrum of which will fall within the maximum bandwidth and whose components will have amplitudes, phases and frequencies which will be functions of time. In any case one may apply to each of these components all the considerations of the signal of equation (4), and the use of suitable signal processing means will allow the extraction from the Doppler spectrum the parameters of those components that are considered useful for the characterization of the motions of the targets selected and will allow initiation of an alarm.

This mixing and signal processing means may be developped by various methods and exploiting various techniques according to the operating frequencies and according to the nature of the waves employed, all these methods and techniques being well known to the people skilled in the arts of physics, electromagnetism and electronics. In the signal previous art embodiments, the processing circuit 8 is followed by a threshold circuit that we shall call a "decision circuit" and further by an alarm actuating circuit, represented respectively by blocks 9 and 10 of FIG. 1a, both of them being variously made according to theories and techniques well known to the people skilled in the art of alarm systems in the field of security.

All the Doppler intrusion sensors of the prior art employ wave fields diffused by a continuously oscillating source in the zone under surveillance giving rise to signals of the type illustrated in FIG. 1B.

A first drawback of such sensors is that the continuous oscillation of the source requires a continuous supply of electric energy to these sources and the consumption of electric energy in widespread application becomes prohibitively high. In fact the intrusion alarm systems to which such sensors are connected should usually remain working for long periods of time when not connected to a power line, thus relying only on the energy stored in either electric storage batteries (or electric cells, or fuel cells, etc.) that for pratical reasons such as price, weight, etc. ought not to have a high capacity. As an example the state of the art microwave doppler sensors employing Gunn effect oscillators as sources have an average power consumption around 2 watts, which renders them not very practical to attain an adequately long autonomous lifetime using the standard storage batteries employed in the field of commercial intruder alarm systems.

Figure 2A:
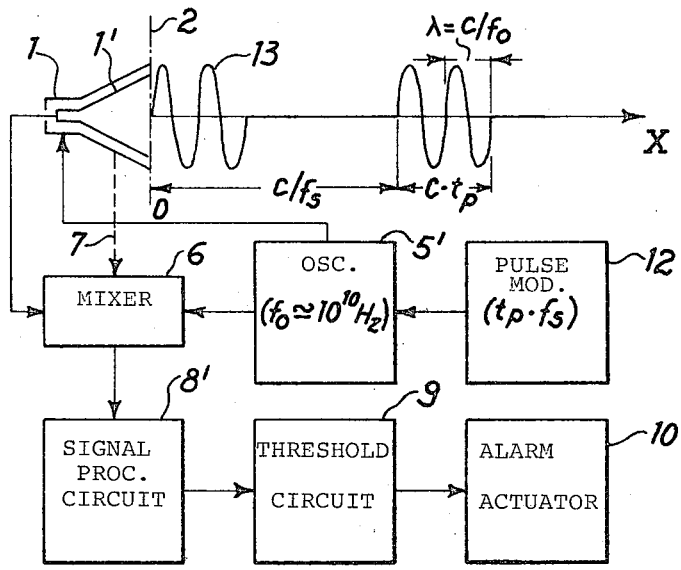
FIG. 2A illustrates one embodiment of the pulsed wave Doppler detection system of the present invention.

The main object of the present invention is a Doppler effect intruder sensor working in a pulsed mode with waves of any nature and frequency, and that may be described with the help of the basic block diagram of FIG. 2A.

This sensor includes: a transmitting antenna 1 to diffuse in the surrounding space pulsed wave fields represented by pulsed wave 13 generated by pulse modulated oscillator 5' at the carrier frequency $\omega_o = 2\pi f_o$; a modulator 12 which modulates oscillator 5' with pulses of time lenght of $t_p$ sec and a pulse repetition frequency $f_s = 1/t_s$, $t_s$ being the time interval between consecutive pulses, and a duty cycle defined by $d = (t_p/t_s)$ smaller than unity.

The return wave is partially captured by receiving antenna 1' and the electric signal from antenna 1' feds mixer 6 together with the a pulsed reference signal obtained by oscillator 5', or alternatively, from the antenna (see dashed line 7 of FIG. 2a). The product mixing of these two signals in mixer 6 gives rise to an output of pulsed signals having amplitudes which, besides depending upon the intensity of the fraction of the return wave intercepted by receiving antenna 1', which depends in turn on the target distance and also depends on the target reflecting area and reflectivity and on the Doppler information relative to that specific target, are in fact amplitude modulated by all the Doppler information consisting of a time-dependent frequency spectrum as said above. An example of such a signal is represented by signal 11' in FIG. 2b. This pulse modulated signal has a frequency spectrum centered around the frequency $f_s$ of the pulses repetition with a bandwidth within the limits represented by $\pm \Delta f_d$ therefore the mixer 6 should in any embodiment of the present invention have a pass band $(f_s \pm \Delta f_d)$ including all the frequencies included in this spectrum.

Figure 2B:
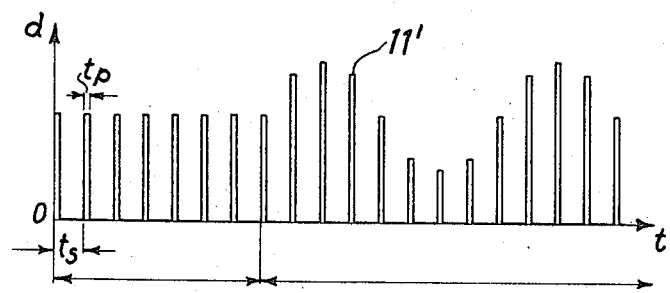
FIG. 2B illustrates an example of a Doppler signal obtainable by the device of the present invention of FIG. 2A.

The type of Doppler signal obtained with a sensor working according to the principles of the present invention and that obtained with the prior art sensors are very unlike, as are the means employed in the two cases, as is evident by inspecting FIG. 1a and FIG. 1b and comparing them respectively with FIG. 2A and FIG. 2B. The adoption of the pulsed working mode for a Doppler intrusion sensor brings about a number of distinct advantages with respect to systems adopting the continuous working mode, the most notable being the following:

(a) a reduction in the energy consumption needed to generate a protecting radiation field of the same peak intensity;

(b) a negligible rise in the temperature of the electric circuitry and of the components used to generate the fields consequent to the low power consumption;

(c) the possibility of an easy increase of the peak power of the protecting waves and therefore of the working range of the sensor thanks to the low energy consumption as in paragraph (a) above;

(d) added security to the alarm system since the received signal is highly coded and therefore a better discrimination can be obtained with respect to interferring signals coming from other sensors, together with higher compatibility among sensors protecting the same volume, since besides a coincidence of the carrier frequency $f_o$ of the sensors a coincidence of their pulse repetition frequency $f_s$ should also occur;

(e) an increased sensitivity of detection, since the signal according to the present invention has the frequency $f_s$ which must be greater than the highest Doppler frequency detected and therefore the signal containing the Doppler information ought to be detected at a frequency surely higher than those present in the detectors of sensors working with continuous waves.

In fact at these (higher) frequencies the level of the 1/f type noise introduced by the mixers usually employed for the conversion of the reflected signal is lower than the noise level at the detected frequencies of the prior art sensors.

Particular conditions however must necessarily be met by a pulsed system in order to be theorically capable of extracting from a sensor working in a pulsed mode, and therefore also from that system depicted in FIG. 2A, all the Doppler information carried by the amplitude modulated pulsed signal of FIG. 2b equivalent to the information carried by the sinusoidal signal of the type depicted in the sensor of FIG. 1b of the prior art. In fact, if we apply information theory to the sinusoidal signal (see: M. Schwartz, in: "Information, Modulation and Noise", McGraw-Hill Kogakusha, Tokio, Chap. 3, 1970) one sees that all the information carried by this type of signal is obtainable by a sampling of the curve in at least two samples within each period, that is by sampling with two pulses within each period and therefore with a sampling frequency or repetition frequency $f_s$ at least twice as great as the highest Doppler frequency $f_2$ to be detected ($f_s > 2f_2$). However, although such theorical considerations would allow the extraction of all the Doppler information from a continuous detected signal sampled in a few points in each period and with pulses as short as one wishes, in order to keep the duty cycle of the pulsed working mode low actually they do not imply that it would be possible to use a source of pulsed waves, since it has actually been assumed only sampling of the detected signal by pulses while the Doppler signal remained continuous such as in the case of transmitted and returned cointinuous waves.

In order to demonstrate the feasibility, under the conditions imposed on $f_s$, of obtaining the full Doppler information in the case of pulse modulated sources also, let us discuss now the case of a transmitted wave pulse modulated such as 13 of FIG. 2A, having a frequency $\omega_o = 2\pi/T_o$, and let us examine also its reflected wave. By adopting the experimental circuit of FIG. 1A, also in this case the transmitted wave has a shape described by $e = E \cos(\omega_o t)$ on the plane 2, while the reflected wave shape is $b = B \cos(\omega_o t - 2 \cdot 2x_o/\lambda)$, similar to the respective waves in the continuous case with the only difference being that in this case they are valid only within the time intervals of the pulses: $0 \leq t \leq t_p$. Let us now assume that target 3 starts moving from $x_o$ along the x-axis toward increasing values of x with constant velocity $V_d$ and that the target starts moving at the precise time of the arrival on it of a wave packet. Then the first return wave packet will be described by:

$$b = B \cos[(\omega_o - \omega_d)t - (4\pi x_o/\mu)] \text{ per } 0 \leq t \leq t_p.$$

The second wave packet will follow the first after a time $t_s$ and therefore will find the target in the position:
$x = x_o + V_d \cdot t_s,$
and the corresponding return wave will be:

$$b_2 = B \cos[(\omega_o - \omega_d)t - 4((x_o + V_d t_s)/\lambda]$$

always within the interval: $0 \leq t \leq t_p$. By extending the treatment to the nth return pulse, one obtains:

$$b_n = B \cos[(\omega_o - \omega_d)t - 4\pi(x_o + (n-1)V_d t_s)/\lambda];$$
$$0 \leq t \leq t_p.$$

By converting this oscillatory signal by a mixer as described above, that is by mixing it with the pulsed waves coming from either the pulsed oscillator or from the transmitting antenna, according techniques and circuits well known to people expert in these fields, and rejecting the terms in $2\omega_o$ one obtains at least the following equation of the Doppler signal valid for the pulsed case and analogous to the equation (4) above (valid only for the continuous case):

$$d_n = D \cos(-\omega_o t - \phi_o - 4\pi(n-1)V_d t_s/\lambda); \ 0 \leq t \leq t_p \qquad (5)$$

Equation (5) describes a signal existing only within the time intervals $t_p$ and which carries a progressive phase shift of $\Delta\phi = 4\pi V_d t_s/\lambda$ with each successive one.

In order to demonstrate that equation (5) is a sampled equation of equation (4), it should be verified that they have the same value when equation (5) exists, and therefore that they have the same argument. Now, during the nth pulse, the argument of equation (5) is: $\phi_{pn} = (-\omega_d t - \phi_o - 4\pi(n-1)V_d t_s/\lambda)$ and the total time interval from the beginning of the first pulse is $t_n = (n-1)t_s + t$. The argument of equation (4) on the other hand is: $\phi_{cw} = (-\omega_d t - \phi_o)$. As said above, it should hold that $\phi_{pn} = \phi_{cw}$ when $\phi_{cw}$ is calculated for $t = t_n$, therefore:

$$-\omega_d((n-1)t_s+t)-\omega_0=(-\omega_d t+\phi_0-4\pi(n-1)V_d t_s/\lambda)$$

wherefrom, one obtains $(-\omega_d+4\pi V_d/\lambda)=0$, which is always verified since by definition is: $\omega_d=(4\pi V_d/\lambda)$.

It should be observed that the above treatment is based on the assumption that all the pulsed oscillations start with the same initial phase; however it can be shown that the treatment is also still valid in the more general case in which this does not necessarily occur.

In order that a pulsed sensor which is the principal object of the present invention may be made to work, as the one in FIG. 2A, it should be designed in such a way that the values of the working parameters of its components would satisfy further conditions besides that imposed on $f_s(f_s>2f_2)$ and that imposed on the bandwidth of the circuits after mixer 6 centered at $f_s$. In fact, in order that the beat between the pulses coming back from the target and those coming from the pulsed oscillator to mixer 6 would occur, their time duration $t_p$ must be definitely longer than the time needed by the waves (electromagnetic ones, acoustic ones, etc.) to go to and come back from the target in the surrounding medium when the target itself is at the longest distance from the sensor (maximum range). This limitation for $t_p$ may be expressed by the relationship: $t_p>(2R_M/V_o)$, where $R_M$ is the maximum range of the sensor and $V_o$ the speed of the waves employed for protecting the supposely homogeneous surrounding medium (c, in the case of microwaves, for instance).

A consequence of the condition imposed upon $t_s$ and $t_p$, is a limitation on the duty cycle $d=(t_p/t_s)$ which will result in having a lower limit of duty cycle d given by $4f_2R_M/V_o$, whilst its upper limit will be lower than unity as much the consumption of power is desired to be reduced. These limitations are of a physical character and are intrinsic to the pulsed mode of operation of the Doppler sensor and therefore ought to be satisfied. As regards instead the optimization of the values of the parameters whose allowable ranges have been established above, that will depend on the specifications wanted and the limitations imposed by the choice of the components and of the circuits adopted for the extraction of the Doppler information and its subsequent processing, which may vary either by way of principle or in their circuit solutions also having in mind the technologies and components most suitable for industrial production.

As an example, a sensor working in the microwave field has been developed to test the feasibility of the choice of the these parameter values, which resulted the following:

$f_1 \simeq 10$ Hz; $f_2 \simeq 400$ Hz; $f_s = 5,000$ Hz $(>2f_2)$ $R_M \sim 30$ m; $t_p 2 \sim \mu$sec $(>(2R_M/c)=0.2$ $\mu$sec$)$:
$d=t_p/t_s=0.01$ these are well within their respective allowable ranges of existence and yet allow the sensor developed to achieve significant saving of energy by employing standard commercial components and industrial technologies. In fact the choice made of $f_s>2f_2$ has eliminated complicated design problems of the filtering means for separating the Doppler frequencies from that the pulse repetition frequency.

The main object of the present invention, in its most general form, is a sensor operating like that of FIG. 2a and characterized by the functional parameter value limitations expressed above. The receiving part of such a sensor also includes after the mixer signal processing circuit 8', including means for extracting the Doppler information carried by the pulse modulated signals such as 11' of FIG. 2B and for subsequent processing of said Doppler signals; decision circuit 9, including the threshold circuits for a decision on the alarm state, such that when the selected Doppler information already extracted from signal 11' and processed by block 8' having a given input level, is compared with internally programmed threshold levels to eventually send, according to the type of programmed decision, a trigger signal to the actuating alarm circuit 10.

A signal such as 11' at the input of signal processing circuit 8' contains all the Doppler information consisting of the frequency, which is a function of the speed of the target, of the amplitude, which is also a function of the distance to the target, and of the phase $\phi$, which is also a function of the forward or backward direction of the motion of the target with respect to the sensor, present as an amplitude modulation of the pulses.

Since the shape of signal 11' of FIG. 2b is different from that of signal 11 of FIG. (1B) the means for extracting the information will be different from the means of the previous art sensors; however it will be possible for an expert of the field to design and develop adequate circuitry exploiting known theories for extracting from the amplitude modulated pulsed signals as 11' all or part of the information needed and for processing it with either analog or digital methods and circuits exploiting theories well known to the experts of the relative fields in order to send the resulting information with proper levels to decision circuit 9.

The type of information to be extracted and the type of processing that may be made, will of course vary according to the logic of the alarm selected.

However, for any selected alarm logic and for any type of extraction and processing of the information, a particular sensor will be characterized by that of FIG. 2A which will fall within the scope of the present invention.

Figure 3:
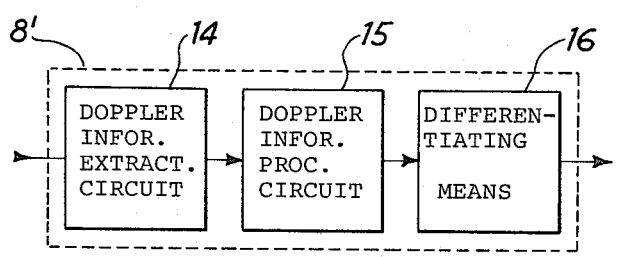
FIG. 3 illustrates an alternative embodiment of the signal processing circuit 8' of FIG. 2A.

A form of the present invention is a sensor having the characteristics of the main object of the present invention, in which, for decreasing the likelihood of false alarms due to phenomena characterized by stationary or even periodical motions, such as rotating parts of motors, fans, fluorescent lights, stationary air flows (as with air conditioners, etc.), signal processing circuit 8' of FIG. 2A processing the pulsed Doppler signals is replaced by signal processing circuit 8' of FIG. 3, which include, in addition to the Doppler information extracting and processing circuits 14 and 15 respectively for the signal 11' of FIG. 2A, also suitable differentiating means 16 of the output level of the processed Doppler information, as in FIG. 3. Because of the presence of this differentiating means 16, a non-zero input signal will be present at decision circuit 9 only if the level of the processed Doppler signal is changing with time. This differentiating means 16 may be designed and developed for any value of the periodical signals and of the speed of stationary or periodical motions, according to either analog or digital methods and circuits well known to people skilled in the relative fields.

The logic functions of signal processing circuit 8' of FIG. 3 may usefully be employed for any signal containing Doppler information either pulsed, as that pertaining to the present invention, or continuous as those pertaining to the prior art sensors and received by any means relative to wave fields of any frequency and kind, since its working principles have the most general applicability.

Figure 4A:
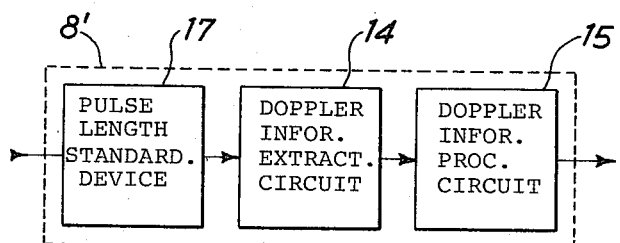
FIG. 4A illustrates another alternative embodiment of the signal processing circuit 8' of FIG. 2A.

Another embodiment of the present invention is a sensor like the main object of the present invention in any one of the embodiments described above wherein the signal processing circuit 8' of FIG. 2A is replaced by signal processing circuit 8' of the FIG. 4A, which includes Doppler information extracting and processing circuits 14 and 15 preceded by block 17, whose function is to standardize the length of the pulses coming from mixer 6 to avoid degradation of the sensitivity in those cases of random significant delay occurring in the leading edge of the pulsed oscillators. In fact, the duration of these detected pulses depends on the following parameters:

(a) the duration of the pulses given by modulator 12;
(b) the duration of the possible jitter of the leading edge of the oscillator pulse;
(c) the time lag of the wave energy required to go to and return from the target.

Figure 4B:
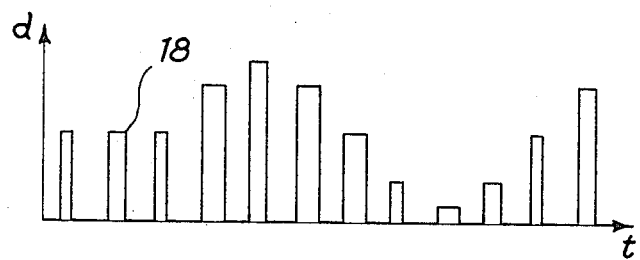
FIG. 4B illustrates another example of a Doppler signal obtainable by the device of the present invention of FIG. 2A in the presence of jitter and other factors causing variable received pulse length.
Figure 4C:
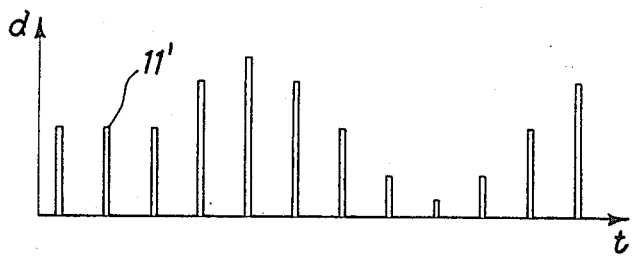
FIG. 4C illustrates an example of a pulse length standardized signal obtainable from the pulse length standurdizing circuit 17 of FIG. 4A.

Because of the (b) and (c) factors above, the pulses detected by mixer 6 do not therefore have a definite length, as is depicted in FIG. 4B. Although the amplitude and duration of a pulse are independent parameters, they will become interdependent as soon as the pulse is propagated through a limited bandwidth circuit, as is generally the case and as in the circuits of the present invention. This circumstance brings about an indeterminacy in the amplitude of the pulsed signal carying the Doppler information giving rise to an increase in the noise level, with a consequent loss of sensitivity. The means provided in the present invention to cancel this effect is a standardizing means for these received pulses reforming their length leaving untouched their peak amplitude, or, more simply, shortening all of them to a predetermined lenght smaller than the shortest of them, as illustrated by the signal 11' of FIG. 4C, obtained from the signal 18 of FIG. 4B after passing through the pulse length standardizing device 17 of FIG. 4A, which ought to be inserted at the input of any circuit detecting and processing the Doppler information, as in FIG. 4A.

Figure 5A:
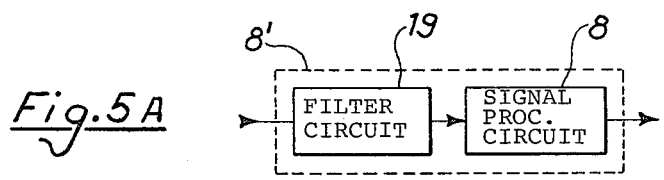
FIG. 5A illustrates a further alternative embodiment of the signal processing circuit 8' of FIG. 2A.

Still another embodiment of the present invention is a sensor like the main object of the present invention including the features of one or more of the preceding embodiments, wherein the processing means of the Doppler information indicated by signal processing circuit 8' of FIG. 2A, is instead constituted by the functional blocks 19 and 8 of FIG. 5A. Block 19 includes a means for detecting the Doppler information from amplitude modulated pulsed signals by reforming continuous Doppler signals out of the Doppler spectrum thus signal processing circuit 8 may be means for processing continuous Doppler signals. The working principle of reforming circuit 19 of FIG. 5A, may usefully be described with the help of FIG. 5D, in which the pulsed signal 22 at the frequency $f_s$ is amplitude modulated by a Doppler signal of frequency $f_d$, having in this example chosen to be $f_s = 8f_d$ in order to amply satisfy the theoretical conditions needed to detect all the information from these pulses. Signal 22 may in fact be considered equivalent to a continuous Doppler signal at $f_d$ sampled eight times each period with pulses at a frequency $f_s$ of duration $t_p$ and with a duty cycle $d = t_p/t_s$. The principal function of the reforming circuit 19 according to the present invention consists principally in a low-pass filtering circuit having a cut-off frequency of $f_d$ or $f_2$, that is the maximum frequency of the Doppler signals, and this filtering action, according to known theories (see: M. Schwartz, loc. cit.) eliminates from signals such as 22 the components at $f_s$ (being $f_s > 2f_d$) and detects the whole Doppler information as a continuous signal similar in all respects to signal 11 of FIG. 1B relative to the same target by a sensor operating with continuous wave.

However with respect to a detected signal such as signal 11 under the same conditions by a sensor operating with continuous waves, the detected signal obtained as signal 22 possesses a peak amplitude which is $t_p/t_s$ (the duty cycle) times smaller of the peak value of the former.

Figure 5B:
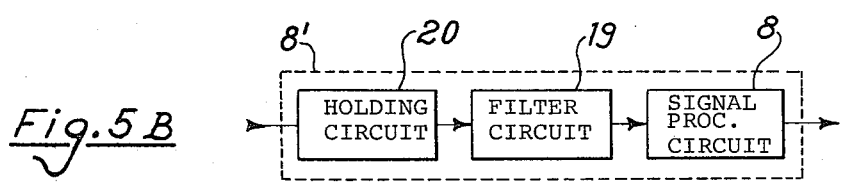
FIG. 5B illustrates a still further alternative embodiment of the signal processing circuit 8' of FIG. 2A.

A further embodiment of the present invention is a sensor like that of the preceding embodiment and including the features of any one or more of the preceding embodiment of the present invention, wherein in the signal processing circuit 8' of FIG. 5B processing the Doppler signal, the reforming circuit 19 for reforming the pulsed signals amplitude modulated by the Doppler signals is now preceded by block 20 as in FIG. 5B, the logic function of which is the electronic memorization of the amplitude of each of the modulated pulsed signal until the next pulse arises, at which time its memory is set to the amplitude of the new pulse. The function of block 20 is known to the experts of electric circuits as pulse stretching, and may be developed in a variety of circuits well known to the experts in the field (see: M. Schwartz, loc. cit.) such as "holding" circuits.

Figure 5C:
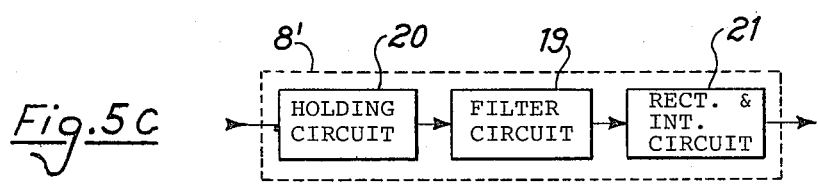
FIG. 5C illustrates an even further alternative embodiment of the signal processing circuit 8' of FIG. 2A.
Figure 5D:
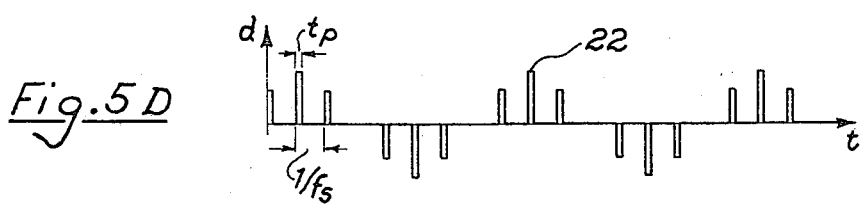
FIG. 5D illustrates an example of a Doppler signal obtainable at an intermediate point of the signal processing circuit 8' of FIG. 5A.
Figure 5E:
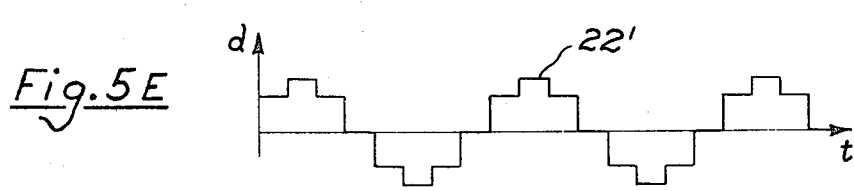
FIG. 5E illustrates an example of a Doppler signal obtainable at an intermediate point of the signal processing circuit 8' of FIG. 5B.

The application of such a circuit to a signal such as signal 22 of FIG. 5D transforms it into a signal like 22' of the FIG. 5E.

Figure 5F:
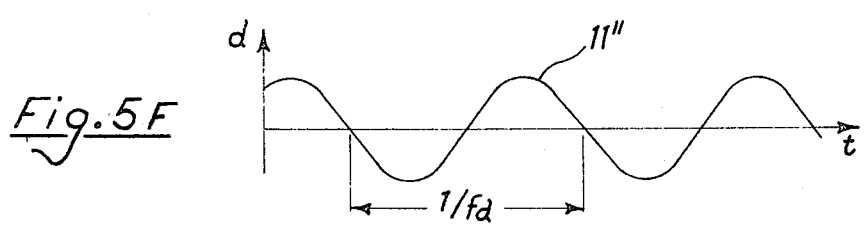
FIG. 5F illustrates an example of a reformed continuous wave Doppler signal obtainable from the output of reforming circuit 19 of either FIG. 5A, 5B or 5C.

In the embodiment of this invention depicted in FIG. 5B, including the holding circuit 20 inserted before the reforming circuit 19 which is followed by the signal processing circuits for continuous signals 8, one will obtain at the output of the latter a continuous Doppler signal like 11' of FIG. 5F similar in all respects to the signal 11 of FIG. 1B obtained from a continuous wave sensor, presenting a negligible attenuation with respect to a continuous wave sensor, and a net signal gain with respect to the use of only the reforming signal circuit 19, as shown in FIG. 5A.

In this embodiment of the present invention, it is intended that this means for memorizing the pulses, be it either a holding circuit or a means of a different kind, may be employed in such a way that their operating cycle, which has to be triggered somehow by the signal to be memorized may be triggered in the following ways:

(a) self triggered by the pulses of the Doppler signal itself;
(b) triggered by suitable pulses obtained from moduator 12;
(c) as in case (b) above in which, however, the triggering pulse is reformed and it is narrower than that of the modulator and delayed with respect to the latter a time longer than the longest jitter of the oscillator plus the longest time needed for the propagation of the transmitted and reflexed wave.

Still a further embodiment of the present invention is any one or more of the preceding, wherein the signal processing circuit 8' of FIG. 5C includes, besides the reforming and holding circuits 19 and 20 of the FIG. 5B previously described, also a further processing block 21, inserted after the reforming circuit 19 as in FIG. 5C, constituted by suitable rectifying means for the reformed continuous Doppler signal, followed by a suitable integrating means having a suitable time constant in order to produce D.C. output levels and suitably limit the sensor receiving circuit bandwidth.

Although the present invention has been described in a detailed way by a certain number of examples for the purpose of clarity and understanding, it should be understood that many modifications may be made and still remain within the scope of the present invention, and many embodiments only apparently different may be made without departing from the purpose of the invention, and that therefore all the matter presented in the above specification and in the enclosed drawings should be interpreted as illustrative only and not in a limiting sense.

In particular, in the functional block diagram of the FIGS. 2, 3, 4 and 5 regarding the main object of the present invention and other embodiments of the same, there are illustrated particular combinations, or else configurations, of various functional blocks, the overall configurations being compatible with the general laws of the electric circuits for explicating the functions described, it is however intended that said configurations have been presented for illustrative and not limitative purposes and therefore they are not to be intended the only possible configurations possible theorically but other configurations are possible with the same functional blocks to obtain the same final purposes, or else to obtain an optimized performance with respect to the parameters affecting it, all of these configurations however falling within the scope of the present invention.

Further, in the functional block diagrams of FIGS. 2, 3, 4 and 5 regarding the principal object of the present invention and other embodiments of the same there have been omitted explicit detailed descriptions of the functional blocks and circuits such as amplifiers, power supplies, needed to bring to suitable levels the signals for correct performance of the circuits of the various blocks, and also there have been omitted means and not given consideration to particular or general circuits either for limiting the noise or for optimizing the circuits in their parts or as a whole, having limited the description only to the operating principles of these embodiments and to the sensor as a whole. It is however intended that all the sensors derived from them through modifications, integrations and improvements and developped with any circuit arrangement, component or technology which would exploit either partially or the whole general operating principles described, compatibly with known circuit theories and in any combination, improved and integrated with other suitable circuits for performing the same or further functions, will fall within the scope of the present invention.

What we claim is:

1. An intruder alarm sensor for detecting, from the Doppler information of pulsed waves reflected from a target, the presence of a target moving at a speed within a range between a slowest target speed of interest and a fastest target speed of interest in the presence of stationary or periodic interference in a zone under surveillance defined by a maximum range, said intruder alarm sensor comprising:

a pulse modulated oscillator means for generating a pulse modulated oscillation signal at a predetermined carrier frequency having a pulse repetition frequency at least twice the Doppler frequency of the fastest target speed of interest and having a pulse width greater than a first predetermined period of time;

a first transducing means connected to said pulse modulated oscillator means for transmitting said pulse modulated oscillation signal for propagation as pulsed wave fields within the zone under surveillance, said first predetermined period of time being twice the period required for said pulsed wave fields to propagate a distance equal to the maximum range of the zone under surveillance;

a second transducing means for receiving pulsed wave signals reflected by a target within the zone of surveillance and for transforming said received pulsed wave signals into pulsed oscillatory electric signals having Doppler information corresponding to the relative motion between the target and said first transducing means;

mixing means connected to said pulse modulated oscillator means and said second transducing means for mixing said pulse modulated oscillation signal and said pulsed oscillatory electric signals for producing a detected pulse signal having said pulse repetition frequency and having amplitude modulation corresponding to said Doppler information, said detected pulse signal having a center frequency and an amplitude modulated bandwidth equal to twice the difference between the Doppler frequency of the fastest target speed of interest and the Doppler frequency of the slowest target speed of interest;

a processing means connected to said mixing means for demodulating said Doppler information which is amplitude modulated on said detected pulse signal for generating a Doppler information signal having an amplitude proportional to the value of said Doppler information;

a comparing means connected to said processing means for comparing said Doppler information signal with a predetermined threshold level for generating an alarm trigger signal when the level of said Doppler information signal exceeds said predetermined threshold level; and an alarm actuating means connected to said comparing means for actuating an alarm when said comparing means generates said alarm trigger signal.

2. An intruder alarm sensor according to claim 1, wherein said processing means comprises:

a low pass filter having said detected pulse signal applied thereto, said low pass filter having a cut-off frequency at the Doppler frequency of the fastest target speed of interest for generating a continuous sinusoidal Doppler signal corresponding in phase, amplitude and frequency to all the components present in the frequency spectrum of said Doppler information.

3. An intruder alarm sensor according to claim 2, wherein said processing means further comprises:

a rectifying circuit connected to said low pass filter for rectifying said continuous sinusoidal Doppler signal; and an integrating circuit connected to said rectifying circuit for integrating said rectified continuous sinusoidal Doppler signal for generating said Doppler information signal having an amplitude proportional to the value of said Doppler information.

4. An intruder alarm sensor according to claim 1, wherein said processing means further comprises a differentiating circuit for differentiating said Doppler information signal, the amplitude of the output of said differentiating circuit being proportional to the difference between the amplitude values of said Doppler information signal measured at two distinct times, whereby said sensor automatically rejects all portions of said Doppler information signal corresponding to a stationary or periodic phenomena interferring with the detection of the motion of the target.

5. An intruder alarm sensor according to claim 1, wherein said processing means further comprises standardization means operatively connected to said mixing means for standardizing said detected pulse signal at the output of said mixing means, said standardizing means equalizing the length of the pulses of said detected pulse signal at the output of said mixing means by reducing the length thereof to a predetermined value and leaving the amplitude thereof unaffected, wherein said standardization means reduces sensitivity losses caused by pulses of said detected pulse signal exhibiting a distribution of lengths.

6. An intruder alarm sensor according to claim 2, wherein said processing means further comprises at its input a holding circuit, connected before said filtering circuit and triggered from said pulses to be demodulated, said holding circuit increasing the length of each of said pulses and leaving the amplitude thereof unchanged, wherein the output of said processing means comprises a step function corresponding to the actual function modulating the amplitude of said pulses.

7. An intruder alarm sensor according to claim 2, wherein said processing means further comprises at its input a holding circuit, connected before said filtering circuit and triggered from said pulses obtained from said oscillating source, said holding circuit increasing the length of each of said pulses and leaving the amplitude thereof unchanged, wherein the output of said processing means comprises a step function corresponding to the actual function modulating the amplitude of said pulses.

* * * * *